(12) United States Patent
Horrod et al.

(10) Patent No.: US 12,310,408 B2
(45) Date of Patent: May 27, 2025

(54) APPARATUS WITH A CIRCUIT FOR CONTROLLING THE POWER MODE OF AN AEROSOL GENERATING DEVICE

(71) Applicant: NICOVENTURES TRADING LIMITED, London (GB)

(72) Inventors: Martin Horrod, Cambridge (GB); Victor Clavez Lopez, Cambridge (GB)

(73) Assignee: NICOVENTURES TRADING LIMITED, London (GB)

( * ) Notice: Subject to any disclaimer, the term of this patent is extended or adjusted under 35 U.S.C. 154(b) by 551 days.

(21) Appl. No.: 17/596,310

(22) PCT Filed: Jun. 25, 2020

(86) PCT No.: PCT/GB2020/051544
§ 371 (c)(1),
(2) Date: Dec. 7, 2021

(87) PCT Pub. No.: WO2020/260885
PCT Pub. Date: Dec. 30, 2020

(65) Prior Publication Data
US 2022/0240585 A1    Aug. 4, 2022

(30) Foreign Application Priority Data

Jun. 28, 2019  (GB) .................................. 1909380

(51) Int. Cl.
*A24F 40/465*  (2020.01)
*A24F 40/50*  (2020.01)
(Continued)

(52) U.S. Cl.
CPC ............ *A24F 40/465* (2020.01); *A24F 40/50* (2020.01); *H02M 7/4815* (2021.05); *H05B 6/06* (2013.01);
(Continued)

(58) Field of Classification Search
CPC ........ A24F 40/465; A24F 40/50; A24F 40/20; A24F 40/40; A24F 40/46; A24F 40/51;
(Continued)

(56) References Cited

U.S. PATENT DOCUMENTS

| | | | |
|---|---|---|---|
| 11,277,884 B2 * | 3/2022 | Stura | A24F 40/50 |
| 2006/0152947 A1 * | 7/2006 | Baker | H02M 3/33507 363/16 |

(Continued)

FOREIGN PATENT DOCUMENTS

| | | | | |
|---|---|---|---|---|
| CA | 2871550 A1 * | 11/2013 | | A24F 40/10 |
| JP | H2-148686 | 11/1988 | | |

(Continued)

OTHER PUBLICATIONS

Japanese Notice of Reasons for Refusal for Japanese Application No. 2021-577350, dated Feb. 21, 2023, 8 pages with English Translation.

(Continued)

*Primary Examiner* — Justin M Kratt
(74) *Attorney, Agent, or Firm* — BURR & FORMAN LLP

(57) ABSTRACT

An apparatus and method of application are described, which include a first switching arrangement configured to generate an alternating current from a power source. The alternating current flows through an inductive element of a resonant circuit for inductively heating a susceptor arrangement and heats an aerosol generating material of an aerosol generating device to generate an aerosol in a heating mode of operation. A driver circuit generates a control signal for controlling the first switching arrangement and a power mode switching arrangement is configured to disconnect at least a part of the driver circuit from the power source in a power saving mode of operation.

25 Claims, 15 Drawing Sheets

(51) Int. Cl.
  H02M 7/48 (2007.01)
  H05B 6/06 (2006.01)
  H05B 6/10 (2006.01)
  *A24F 40/20* (2020.01)
  *A24F 40/40* (2020.01)
  *A24F 40/46* (2020.01)
  *A24F 40/51* (2020.01)
  *A24F 40/57* (2020.01)
  *H02M 7/53* (2006.01)
  *H02M 7/537* (2006.01)
  *H02M 7/5387* (2007.01)
  *H05B 1/02* (2006.01)
  *H05B 6/02* (2006.01)

(52) U.S. Cl.
  CPC ............. H05B 6/105 (2013.01); H05B 6/108 (2013.01); *A24F 40/20* (2020.01); *A24F 40/40* (2020.01); *A24F 40/46* (2020.01); *A24F 40/51* (2020.01); *A24F 40/57* (2020.01); *H01M 2220/30* (2013.01); *H02M 7/53* (2013.01); *H02M 7/537* (2013.01); *H02M 7/5387* (2013.01); *H02M 7/53871* (2013.01); *H05B 1/0227* (2013.01); *H05B 1/0244* (2013.01); *H05B 6/02* (2013.01); *H05B 6/10* (2013.01); *Y02E 60/10* (2013.01)

(58) Field of Classification Search
  CPC ....... A24F 40/57; H02M 7/4815; H02M 7/53; H02M 7/537; H02M 7/5387; H02M 7/53871; H05B 6/06; H05B 6/105; H05B 6/108; H05B 1/0227; H05B 1/0244; H05B 6/02; H05B 6/10; H01M 2220/30; Y02E 60/10

See application file for complete search history.

(56) References Cited

U.S. PATENT DOCUMENTS

| | | | |
|---|---|---|---|
| 2010/0237794 | A1* | 9/2010 | Matsuzaki ........ H02M 7/53871 |
| | | | 315/224 |
| 2017/0145886 | A1* | 5/2017 | Crawford ............... H05B 6/365 |
| 2019/0335547 | A1* | 10/2019 | Yoon ...................... H05B 6/062 |
| 2020/0154770 | A1* | 5/2020 | Hepworth ............... A24F 40/42 |

FOREIGN PATENT DOCUMENTS

| | | |
|---|---|---|
| JP | 2017-501682 | 1/2017 |
| JP | 2017-148065 | 8/2017 |
| WO | WO-2018093073 A1 | 5/2018 |
| WO | 2018-207537 | 11/2018 |
| WO | WO-2018206940 A1 | 11/2018 |
| WO | 2019-002377 | 1/2019 |
| WO | WO-2019002377 A1 | 1/2019 |
| WO | 2019-122094 | 6/2019 |
| WO | 2019122097 A1 | 6/2019 |
| WO | WO-2019122094 A1 | 6/2019 |

OTHER PUBLICATIONS

International Search Report and Written Opinion for Application No. PCT/GB2020/051544, mailed on Sep. 23, 2020, 18 pages.

* cited by examiner

APPARATUS WITH A CIRCUIT FOR CONTROLLING THE POWER MODE OF AN AEROSOL GENERATING DEVICE

PRIORITY CLAIM

The present application is a National Phase entry of PCT Application No. PCT/GB2020/051544, filed Jun. 25, 2020, which claims priority from GB Patent Application No. 1909380.6, filed Jun. 28, 2019, each of which is hereby fully incorporated herein by reference.

TECHNICAL FIELD

The present specification relates to an apparatus for an aerosol generating device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate.

SUMMARY

In a first aspect, this disclosure describes an apparatus comprising: a first switching arrangement configured to generate an alternating current from a power source, said alternating current flowing through an inductive element of a resonant circuit (such as an LC resonant circuit) for inductively heating a susceptor arrangement to heat an aerosol generating material of an aerosol generating device to thereby generate an aerosol in a heating mode of operation; a driver circuit for generating a control signal for controlling the first switching arrangement; and a power mode switching arrangement configured to disconnect at least a part of the driver circuit from the power source in a power saving mode of operation. The apparatus may further comprise the resonant circuit.

A boost converter may be provided for boosting a DC level of the power source to an operational DC level, wherein the power mode switching arrangement is configured to disconnect the boost converter from the power source in the power saving mode of operation.

The first switching arrangement may comprise an H-bridge circuit used to generate the alternating current by switching between positive and negative voltage sources.

Some embodiments further comprise a control module for controlling the power mode switching arrangement, wherein the control module sets the apparatus in the heating mode of operation or the power saving mode of operation and controls the power mode switching arrangement accordingly. The control module may be configured to set the apparatus in the power saving mode of operation in the event that one or more of the following conditions are met: the aerosol generating device has been inactive in the heating mode of operation for a first threshold time period; the aerosol generating device is deactivated by a user; a device comprising the susceptor arrangement is removed from the aerosol generating device; an article that is heated by said susceptor arrangement is removed from the aerosol generating device; or a battery of the apparatus has a charge level below a battery threshold.

Alternatively, or in addition, the control module may be configured to set the apparatus to the heating mode of operation in the event that one or more of the following conditions are met: the aerosol generating device has been in the power saving mode of operation for a second threshold time period; the aerosol generating device is activated by a user; a device comprising the susceptor arrangement is inserted into the aerosol generating device; an article that is heated by said susceptor arrangement is inserted into the aerosol generating device; or a movement sensor output is indicative of an intended use of the aerosol generating device.

The power mode switching arrangement may be configured to disconnect one or more further modules from the power source in the power saving mode of operation.

In a second aspect, this specification describes an apparatus comprising: heating circuitry for causing heating of a heating element; and a processor element having a heating mode of operation and a power saving mode of operation, wherein in the heating mode of operation, the processor element is configured to provide electrical power from a power source to the heating circuitry, and wherein the power saving mode of operation uses less power than the heating mode of operation, wherein at least part of the heating circuitry is electrically coupled to the power source via a power switching arrangement and the processor element is configured to operate the power switching arrangement such that the at least a part of the heating circuitry is electrically disconnected from the power source when the processor element is in the power saving mode of operation.

The heating element may comprise an inductive element of a resonant circuit for inductively heating a susceptor arrangement to heat an aerosol generating material of an aerosol generating device to thereby generate an aerosol in the heating mode of operation.

Some embodiments further comprise a control module, wherein: the control module is configured to set the processor element in the heating mode in the event that: the heating circuitry has been inactive in the heating mode of operation for a first threshold time period; the heating circuitry is deactivated by a user; an article being heated by the heating circuitry is removed; or a battery of the apparatus has a charge level below a battery threshold; and the control module is configured to set the processor element in the power saving mode in the event that: the heating circuitry has been in the power saving mode of operation for a second threshold time period; the heating circuitry is activated by a user; an article to be heated by the heating circuitry is inserted; or a movement sensor output is indicative of an intended use of the apparatus.

One or more further modules may be provided that are electrically coupled to the power source via the power switching arrangement, wherein the processor element is configured to operate the power switching arrangement such that at least some of the one or more further modules are electrically disconnected from the power source when the processor element is in the power saving mode of operation In a third aspect, this specification describes a non-combustible aerosol generating device comprising an apparatus including any of the features of the first or second aspects described above. The aerosol generating device may be configured to receive a removable article (which removable article may include said susceptor arrangement) comprising an aerosol generating material. The aerosol generating material may comprise an aerosol generating substrate and an aerosol forming material. The apparatus may comprise a tobacco heating system.

In a fourth aspect, this specification describes a method comprising: setting a mode of operation of an aerosol generating device to a heating mode of operation or a power saving mode of operation, wherein the aerosol generating device comprises a resonant circuit comprising an inductive element for inductively heating a susceptor arrangement to heat an aerosol generating material to thereby generate an aerosol in the heating mode of operation; and controlling a power mode switching arrangement to enable a driver circuit of the aerosol generating device in the heating mode of operation and to disable the driver circuit in the power saving mode of operation, such that at least part of the driver circuit is disconnected from the power source in the power saving mode of operation.

The aerosol generating device may be set to the power saving mode of operation in one or more of the following circumstances: in the event that the aerosol generating device has been inactive in the heating mode of operation for a first threshold time period; in the event that the aerosol generating device is deactivated by a user; in the event that an article comprising the susceptor arrangement is removed from the aerosol generating device; in the event that a replaceable article that is heated by said susceptor arrangement is removed from the aerosol generating device; or in the event that a battery of the apparatus has a charge level below a battery threshold.

The aerosol generating device may be set to the heating mode of operation in one or more of the following circumstances: in the event that the aerosol generating device has been in the power saving mode of operation for a second threshold time period; in the event that the aerosol generating device is activated by a user; in the event that an article comprising the susceptor arrangement is inserted into the aerosol generating device; in the event that a replaceable article that is heated by said susceptor arrangement is inserted into the aerosol generating device; or in the event that a movement sensor output is indicative of an intended use of the aerosol generating device.

In a fifth aspect, this specification describes computer-readable instructions which, when executed by a computing apparatus, cause the computing apparatus to perform any method as described with reference to the fourth aspect.

In a sixth aspect, this specification describes a kit of parts comprising an article for use in a non-combustible aerosol generating system, wherein the non-combustible aerosol generating system comprises an apparatus including any of the features of the first or second aspects described above or an aerosol generating device including any of the features of the third aspect described above. The article may be a removable article comprising an aerosol generating material.

In a seventh aspect, this specification describes a computer program comprising instructions for causing an apparatus to perform at least the following: set a mode of operation of an aerosol generating device to a heating mode of operation or a power saving mode of operation, wherein the aerosol generating device comprises a resonant circuit comprising an inductive element for inductively heating a susceptor arrangement to heat an aerosol generating material to thereby generate an aerosol in the heating mode of operation; and control a power mode switching arrangement to enable a driver circuit of the aerosol generating device in the heating mode of operation and to disable the driver circuit in the power saving mode of operation, such that at least part of the driver circuit is disconnected from a power source in the power saving mode of operation.

BRIEF DESCRIPTION OF THE DRAWINGS

Example embodiments will now be described, by way of example only, with reference to the following schematic drawings, in which.

DETAILED DESCRIPTION

Figure 1:
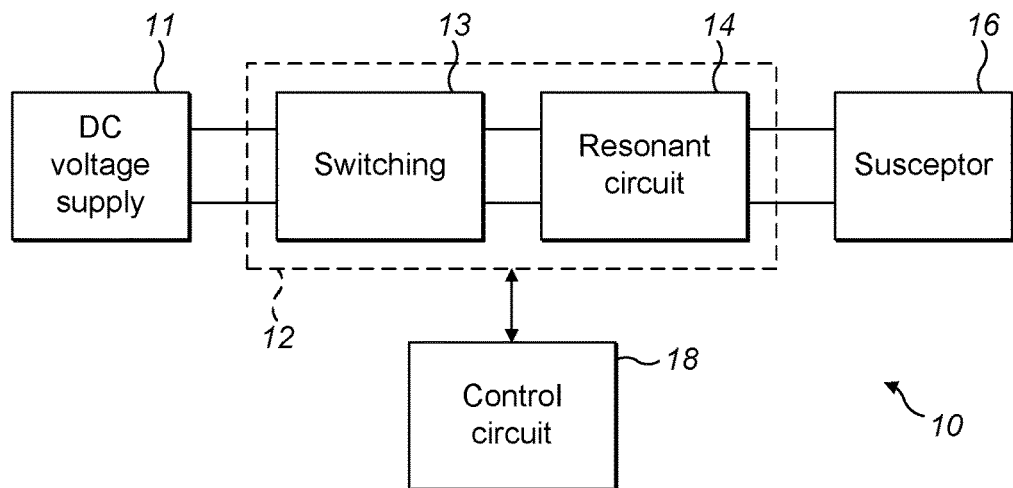
FIG. 1 is a block diagram of a system in accordance with an example embodiment.

As used herein, the term "delivery system" is intended to encompass systems that deliver a substance to a user, and includes: combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material); non-combustible aerosol provision systems that release compounds from an aerosolizable material without combusting the aerosolizable material, such as electronic cigarettes, tobacco heating products, and hybrid systems to generate aerosol using a combination of aerosolizable materials; articles comprising aerosolizable material and configured to be used in one of these non-combustible aerosol provision systems; and aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid, or gel, and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception.

The aerosol forming material may comprise one or more of glycerin, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

FIG. 1 is a block diagram of a system, indicated generally by the reference numeral 10, in accordance with an example embodiment. System 10 comprises a power source in the form of a direct current (DC) voltage supply 11, a switching arrangement 13, a resonant circuit 14, a susceptor arrangement 16, and a control circuit 18. The switching arrangement 13 and the resonant circuit 14 may be coupled together in an inductive heating arrangement 12.

The resonant circuit 14 may comprise a capacitor and one or more inductive elements for inductively heating the susceptor arrangement 16 to heat an aerosol generating material. Heating the aerosol generating material may thereby generate an aerosol.

The switching arrangement 13 may enable an alternating current to be generated from the DC voltage supply 11. The alternating current may flow through the one or more inductive elements and may cause the heating of the susceptor arrangement 16. The switching arrangement 13 may comprise a plurality of transistors. Example DC-AC converters include H-bridge or inverter circuits, examples of which are discussed below. It should be noted that the provision of a DC voltage supply 11 from which a pseudo AC signal is generated is not an essential feature; for example, a controllable AC supply or an AC-AC converter may be provided. Thus, an AC input could be provided (such as from a mains supply or from an inverter).

Figure 2:
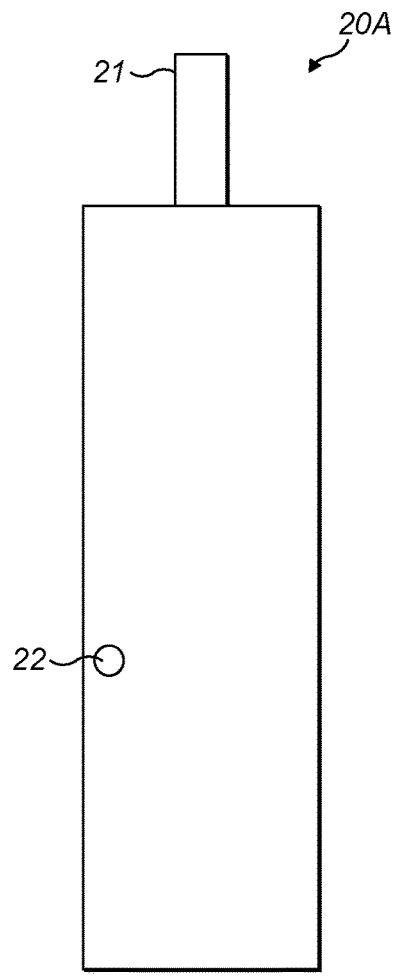
FIG. 2 shows a non-combustible aerosol provision device in accordance with an example embodiment.
Figure 3:
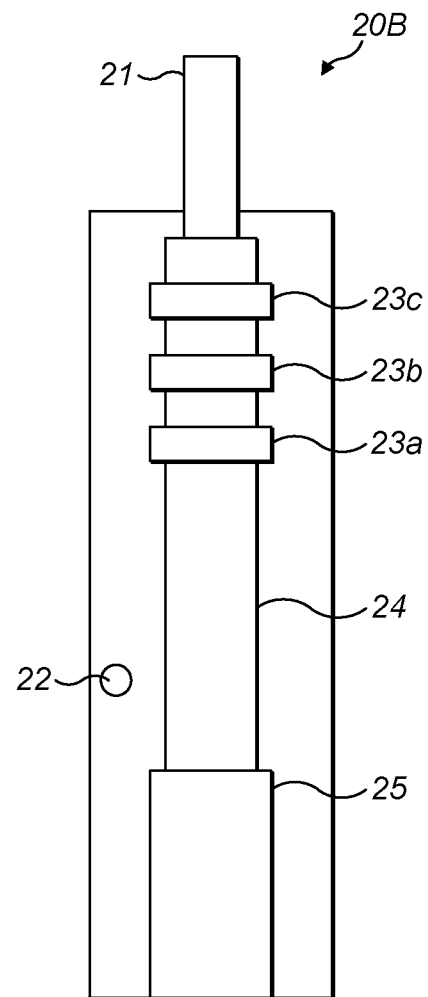
FIG. 3 is a view of a non-combustible aerosol provision device in accordance with an example embodiment.

FIGS. 2 and 3 show a non-combustible aerosol provision device, indicated generally by the reference numeral 20, in accordance with an example embodiment. FIG. 2 depicts an aerosol provision device 20A with an outer cover. The aerosol provision device 20A may comprise a replaceable article 21 that may be inserted in the aerosol provision device 20A to enable heating of a susceptor comprised within the article 21 (or provided elsewhere). The aerosol provision device 20A may further comprise an activation switch 22 that may be used for switching on or switching off the aerosol provision device 20A. Further elements of the aerosol provision device 20 are illustrated in FIG. 3.

FIG. 3 is a perspective illustration of an aerosol provision device 20B with the outer cover removed. The aerosol generating device 20B comprises the article 21, the activation switch 22, a plurality of inductive elements 23a, 23b, and 23c, and one or more air tube extenders 24 and 25. The one or more air tube extenders 24 and 25 may be optional.

The plurality of inductive elements 23a, 23b, and 23c may each form part of a resonant circuit, such as the resonant circuit 14 of FIG. 1. For example, the inductive element 23a may comprise a helical inductor coil. In one example, the helical inductor coil is made from Litz wire/cable which is wound in a helical fashion to provide the helical inductor coil. Many alternative inductor formations are possible, such as inductors formed within a printed circuit board. The inductive elements 23b and 23c may be similar to the inductive element 23a. The use of three inductive elements 23a, 23b and 23c is not essential to all example embodiments. Thus, the aerosol generating device 20 may comprise one or more inductive elements A susceptor may be provided as part of the article 21. In an example embodiment, when the article 21 is inserted in aerosol generating device, the aerosol generating device 20 may be turned on due to the insertion of the article 21. This may be due to detecting the presence of the article 21 in the aerosol generating device using an appropriate sensor (e.g., a light sensor) or, in cases where the susceptor forms a part of the article 21, by detecting the presence of the susceptor using the resonant circuit 14, for example. When the aerosol generating device 20 is turned on, the inductive elements 23 may cause the article 21 to be inductively heated through the susceptor. In an alternative embodiment, the susceptor may be provided as part of the aerosol generating device 20 (e.g. as part of a holder for receiving the article 21).

Figure 4:
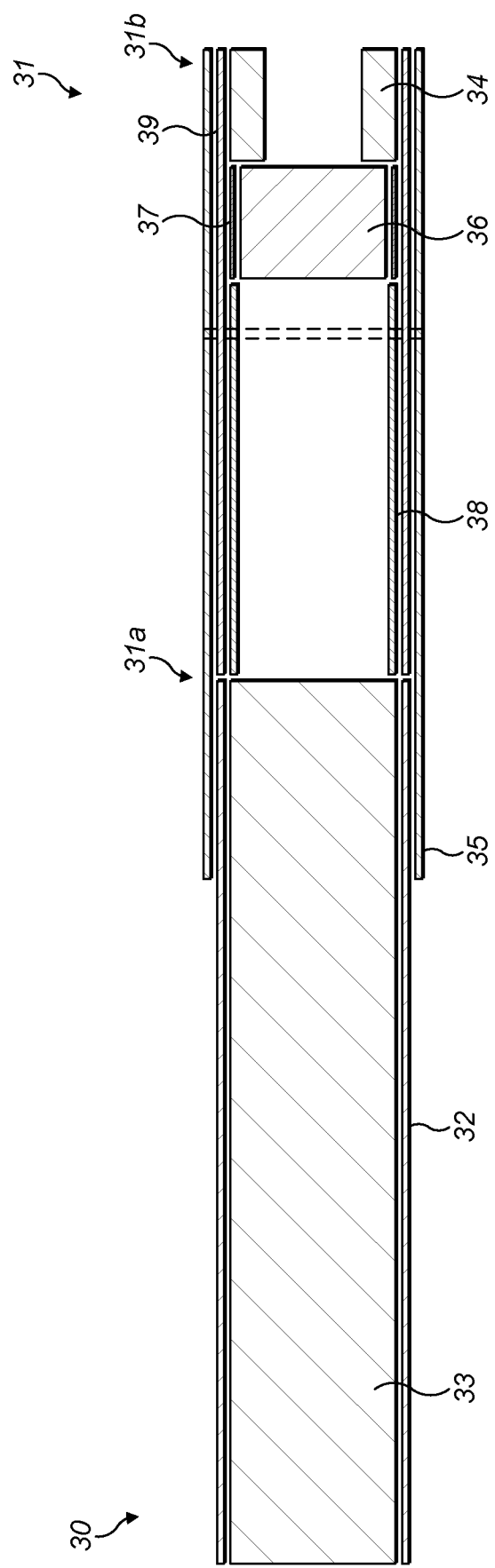
FIG. 4 is a view of an article for use with a non-combustible aerosol provision device in accordance with an example embodiment.

FIG. 4 is a view of an article, indicated generally by the reference numeral 30, for use with a non-combustible aerosol provision device in accordance with an example embodiment. The article 30 is an example of the replaceable article 21 described above with reference to FIGS. 2 and 3.

The article 30 comprises a mouthpiece 31, and a cylindrical rod of aerosol generating material 33, in the present example tobacco material, connected to the mouthpiece 31. The aerosol generating material 33 provides an aerosol when heated, for instance within a non-combustible aerosol generating device, such as the aerosol generating device 20, as described herein. The aerosol generating material 33 is wrapped in a wrapper 32. The wrapper 32 can, for instance, be a paper or paper-backed foil wrapper. The wrapper 32 may be substantially impermeable to air.

In one embodiment, the wrapper 32 comprises aluminum foil. Aluminum foil has been found to be effective at enhancing the formation of aerosol within the aerosol generating material 33. In the present example, the aluminum foil has a metal layer having a thickness of about 6 μm. In the present example, the aluminum foil has a paper backing. However, in alternative arrangements, the aluminum foil can have other thicknesses, for instance between 4 μm and 16 μm in thickness. The aluminum foil also need not have a paper backing, but could have a backing formed from other materials, for instance to help provide an appropriate tensile strength to the foil, or it could have no backing material. Metallic layers or foils other than aluminum can also be used. Moreover, it is not essential that such metallic layers are provided as part of the article 30; for example, such a metallic layer could be provided as part of the apparatus 20.

The aerosol generating material 33, also referred to herein as an aerosol generating substrate 33, comprises at least one aerosol forming material. In the present example, the aerosol forming material is glycerol. In alternative examples, the aerosol forming material can be another material as described herein or a combination thereof. The aerosol forming material has been found to improve the sensory performance of the article, by helping to transfer compounds such as flavor compounds from the aerosol generating material to the consumer.

As shown in FIG. 4, the mouthpiece 31 of the article 30 comprises an upstream end 31a adjacent to an aerosol generating substrate 33 and a downstream end 31b distal from the aerosol generating substrate 33. The aerosol generating substrate may comprise tobacco, although alternatives are envisioned.

The mouthpiece 31, in the present example, includes a body of material 36 upstream of a hollow tubular element 34, in this example adjacent to and in an abutting relationship with the hollow tubular element 34. The body of material 36 and hollow tubular element 34 each define a substantially cylindrical overall outer shape and share a common longitudinal axis. The body of material 36 is wrapped in a first plug wrap 37. The first plug wrap 37 may have a basis weight of less than 50 gsm, such as between about 20 gsm and 40 gsm.

In the present example the hollow tubular element 34 is a first hollow tubular element 34 and the mouthpiece includes a second hollow tubular element 38, also referred to as a cooling element, upstream of the first hollow tubular element 34. In the present example, the second hollow tubular element 38 is upstream of, adjacent to and in an abutting relationship with the body of material 36. The body of material 36 and second hollow tubular element 38 each define a substantially cylindrical overall outer shape and share a common longitudinal axis. The second hollow tubular element 38 is formed, in this example, from a plurality of layers of paper which are parallel wound, with butted seams, to form the tubular element 38. In the present example, first and second paper layers are provided in a two-ply tube, although in other examples 3, 4 or more paper layers can be used forming 3, 4 or more ply tubes. Other constructions can be used, such as spirally wound layers of paper, cardboard tubes, tubes formed using a papier-mâché type process, molded or extruded plastic tubes or similar. The second hollow tubular element 38 can also be formed using a stiff plug wrap and/or tipping paper as the second plug wrap 39 and/or tipping paper 35 described herein, meaning that a separate tubular element is not required.

The second hollow tubular element 38 is located around and defines an air gap within the mouthpiece 31 which acts as a cooling segment. The air gap provides a chamber through which heated volatilized components generated by the aerosol generating material 33 may flow. The second hollow tubular element 38 is hollow to provide a chamber for aerosol accumulation yet rigid enough to withstand axial compressive forces and bending moments that might arise during manufacture and whilst the article 21 is in use. The second hollow tubular element 38 provides a physical displacement between the aerosol generating material 33 and the body of material 36. The physical displacement provided by the second hollow tubular element 38 will provide a thermal gradient across the length of the second hollow tubular element 38.

Of course, the article 30 is provided by way of example only. The skilled person will be aware of many alternative arrangements of such an article that could be used in the systems described herein.

Figure 5:
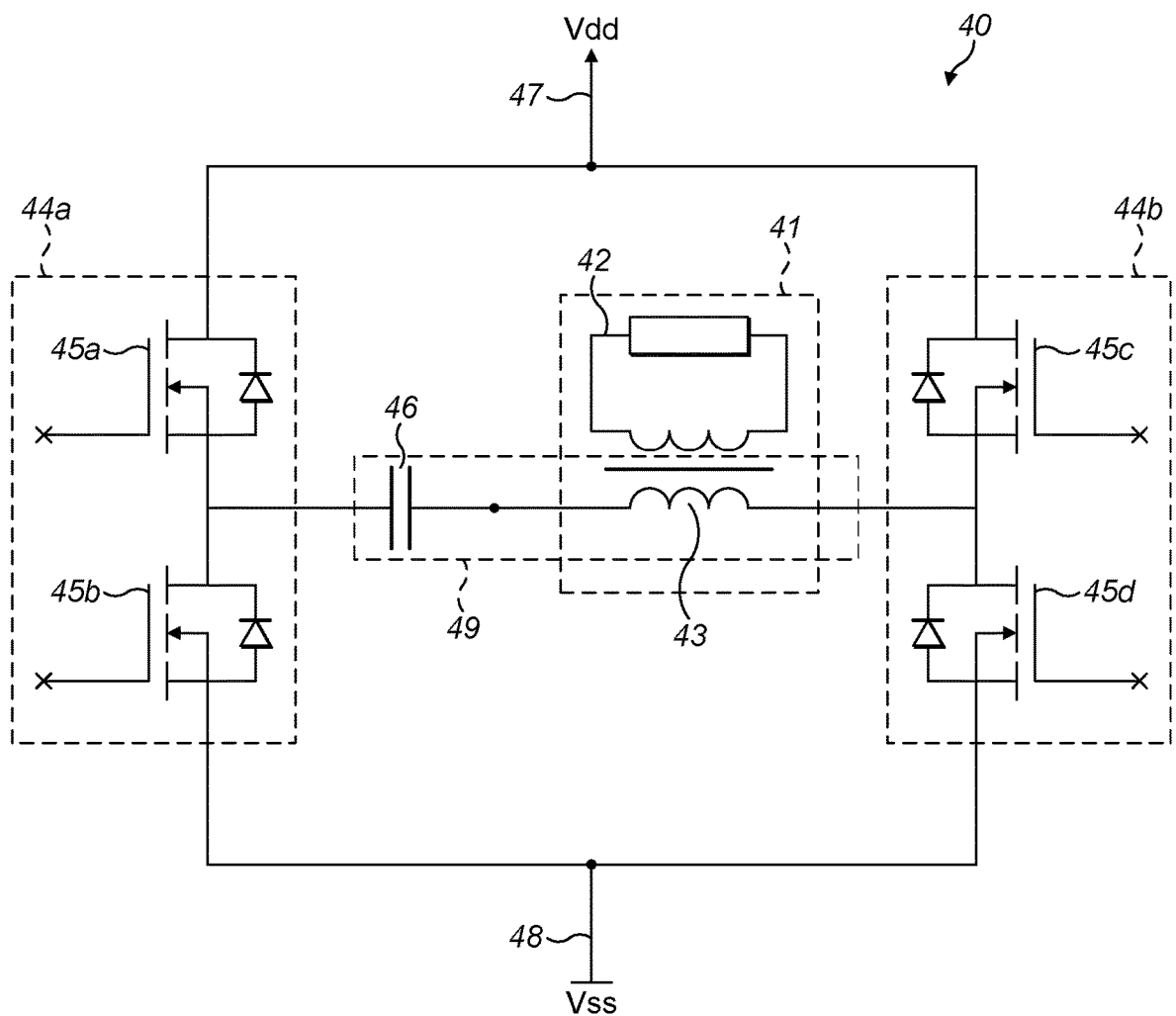
FIG. 5 is a block diagram of a circuit in accordance with an example embodiment.

FIG. 5 is a block diagram of a circuit, indicated generally by the reference numeral 40, in accordance with an example embodiment. The circuit 40 comprises a positive terminal 47 and a negative (ground) terminal 48 (that are an example implementation of the DC voltage supply 11 of the system 10 described above with regard to FIG. 1). The circuit 40 comprises a switching arrangement 44 (implementing the switching arrangement 13 described above), where the switching arrangement 44 comprises a bridge circuit (e.g. an H-bridge circuit, such as an FET H-bridge circuit). The switching arrangement 44 comprises a first circuit branch 44a and a second circuit branch 44b, where the first circuit branch 44a and the second circuit branch 44b may be coupled by a resonant circuit 49 (implementing the resonant circuit 14 described above). The first circuit branch 44a comprises switches 45a and 45b, and the second circuit branch 44b comprises switches 45c and 45d. The switches 45a, 45b, 45c, and 45d may be transistors, such as field-effect transistors (FETs), and may receive inputs from a controller, such as the control circuit 18 of the system 10. The resonant circuit 49 comprises a capacitor 46 and an inductive element 43 such that the resonant circuit 49 may be an LC resonant circuit. The circuit 40 further shows a susceptor equivalent circuit 42 (thereby implementing the susceptor arrangement 16). The susceptor equivalent circuit 42 comprises a resistance and an inductive element that indicate the electrical effect of an example susceptor arrangement 16. When a susceptor is present, the susceptor arrangement 42 and the inductive element 43 may act as a transformer 41. Transformer 41 may produce a varying magnetic field such that the susceptor is heated when the circuit 40 receives power. During a heating operation, in which the susceptor arrangement 16 is heated by the inductive arrangement, the switching arrangement 44 is driven (e.g., by control circuit 18) such that each of the first and second branches are coupled in turn such that an alternating current is passed through the resonant circuit 14. The resonant circuit 14 will have a resonant frequency, which is based in part on the susceptor arrangement 16, and the control circuit 18 may be configured to control the switching arrangement 44 to switch at the resonance frequency or a frequency close to the resonant frequency. Driving the switching circuit at or close to resonance helps improve efficiency and reduces the energy being lost to the switching elements (which causes unnecessary heating of the switching elements). In an example in which the article 21 comprising an aluminum foil is to be heated, the switching arrangement 44 may be driven at a frequency of around 2.5 MHz. However, in other implementations, the frequency may, for example, be anywhere between 500 kHz to 4 MHz.

A susceptor is a material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

In embodiments, the susceptor is in the form of a closed circuit. It has been found in some embodiments that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 6:
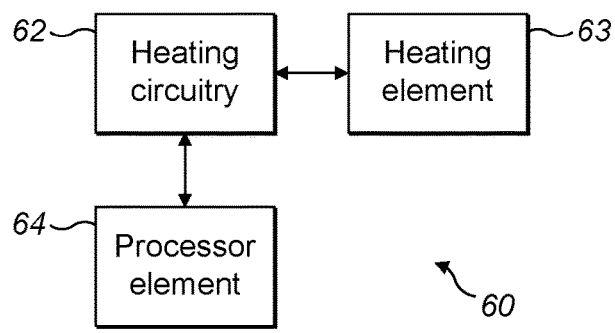
FIG. 6 is a block diagram of a system in accordance with an example embodiment.

FIG. 6 is a block diagram of a system, indicated generally by the reference numeral 60, in accordance with an example embodiment. The system 60 comprises heating circuitry 62, a heating element 63 and a processor element 64. The heating circuitry can be used for causing heating (e.g. inductive heating) of the heating element 63 under the control of the processing element 64.

The heating circuitry 62 may include a voltage supply, switching arrangement, and resonant circuits, such as the DC voltage supply 11, switching arrangement 13 and a resonant circuit 14 of the system 10 described above with regard to FIG. 1. The heating element 63 may include the susceptor arrangement 16 of the system 10. The processor element 64 may include at least some of the functionality of the control circuit 18 and includes a heating mode of operation and a power saving mode of operation, as discussed further below.

Figure 7:
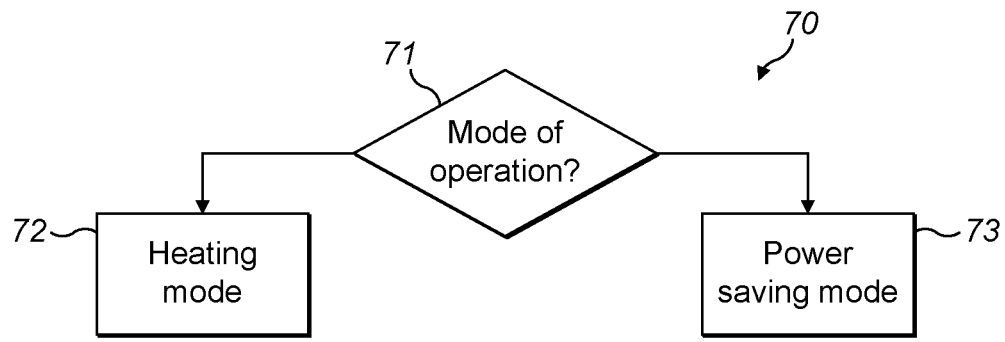
FIG. 7 is a flow chart showing an algorithm in accordance with an example embodiment.

FIG. 7 is a flow chart showing an algorithm, indicated generally by the reference numeral 70, in accordance with an example embodiment. For example, the algorithm 70 may be implemented using the example system 60 of FIG. 6.

The algorithm 70 starts at operation 71, where a mode of operation is determined. If a heating mode of operation is determined, then the algorithm 70 moves to operation 72. If a power saving mode of operation is determined, then the algorithm 70 moves to operation 73.

In the heating mode of operation, the processor element 64 is configured to provide electrical power from a power source to the heating circuitry 62. The power drawn during the heating mode can be considerable. In the power saving mode of operation, at least a part of the heating circuitry 62 is electrically disconnected from the power source when the processor element 64 is in the power saving mode of operation, as discussed further below.

Figure 8:
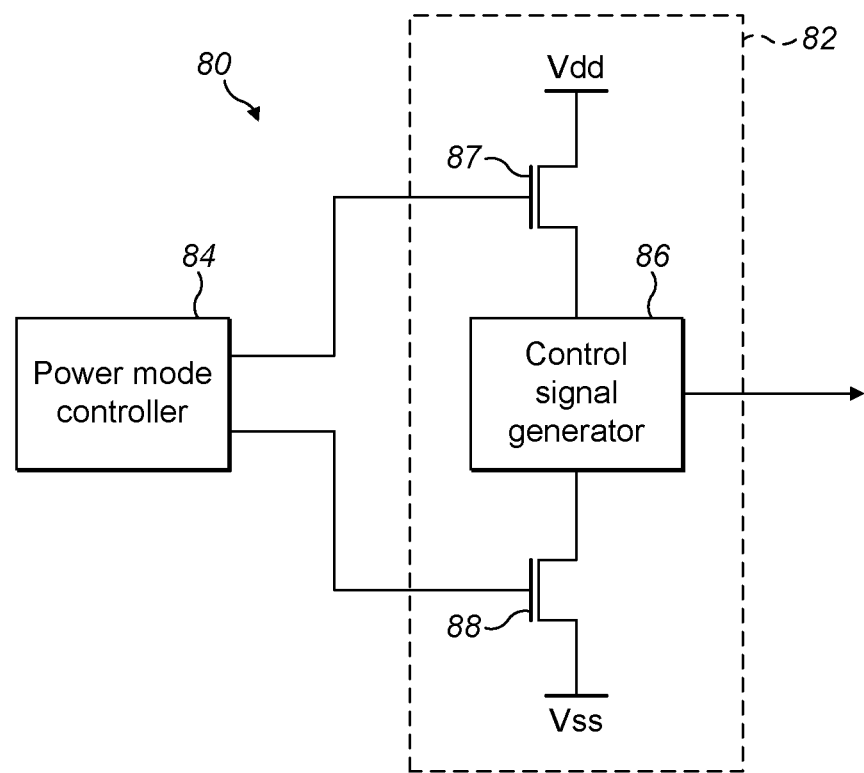
FIG. 8 is a block diagram of a system in accordance with an example embodiment.

FIG. 8 is a block diagram of a system, indicated generally by the reference numeral 80, in accordance with an example embodiment. The system 80 includes a driver circuit 82 and a power mode controller 84. The driver circuit 82 comprises a control signal generator 86 for generating a control signal for controlling a switching arrangement (such as the switching arrangement 13 of the system 10 described above with regard to FIG. 1). Thus, the output of the control signal generator is used to generate an alternating current from the DC power supply 11 of the system 10. The system 80 may be implemented as part of the control circuit 18 of the system 10 described above.

The driver circuit 82 also comprises a power mode switching arrangement including a first transistor switch 87 and a second transistor switch 88 configured to disconnect the control signal generator 86 from a power supply (indicated by the positive and negative power supplies $V_{dd}$ and $V_{ss}$). The power mode switching arrangement of the driver circuit 82 is under the control of the power mode controller 84.

Thus, in the heating mode of operation, the power mode controller 84 enables power to be provided to the control signal generator 86 such that control signals can be provided to the switching arrangement 13. In the power saving mode of operation, the power mode controller 84 disconnects the control signal generator 86 (i.e. part of the driver circuit 82) from the power supply.

It should be appreciated that in some implementations the processor element, such as processor element 64 of FIG. 6, may have its own power save mode, referred to as a sleep mode, in which the functions of the processor element are reduced, e.g., the processor element 64 may only perform check or perform actions at a much lower rate as compared to operating in a non-sleep mode, or simply not perform certain functions. However, even in a sleep mode, components that are connected to the processor element 64 may draw power from the power supply thus leading to a decrease in the stored power in the power supply, and ultimately a reduced lifetime per charge of the system. Hence, in accordance with the present disclosure, certain electric components, such as the drive circuitry, which draw power from the power supply even when not active, are disconnected from the power supply in a power saving mode to prevent these components drawing power from the power supply.

In one embodiment, the charge pump circuit for the high-side FETs of the switching arrangement 44, of example circuit 40 in FIG. 5, draws a particularly high current in use. Clock generators of the system may also draw high currents. Thus, the power mode controller arrangement described herein may be used, for example, with any circuit having a high side N-channel FET.

Figure 9:
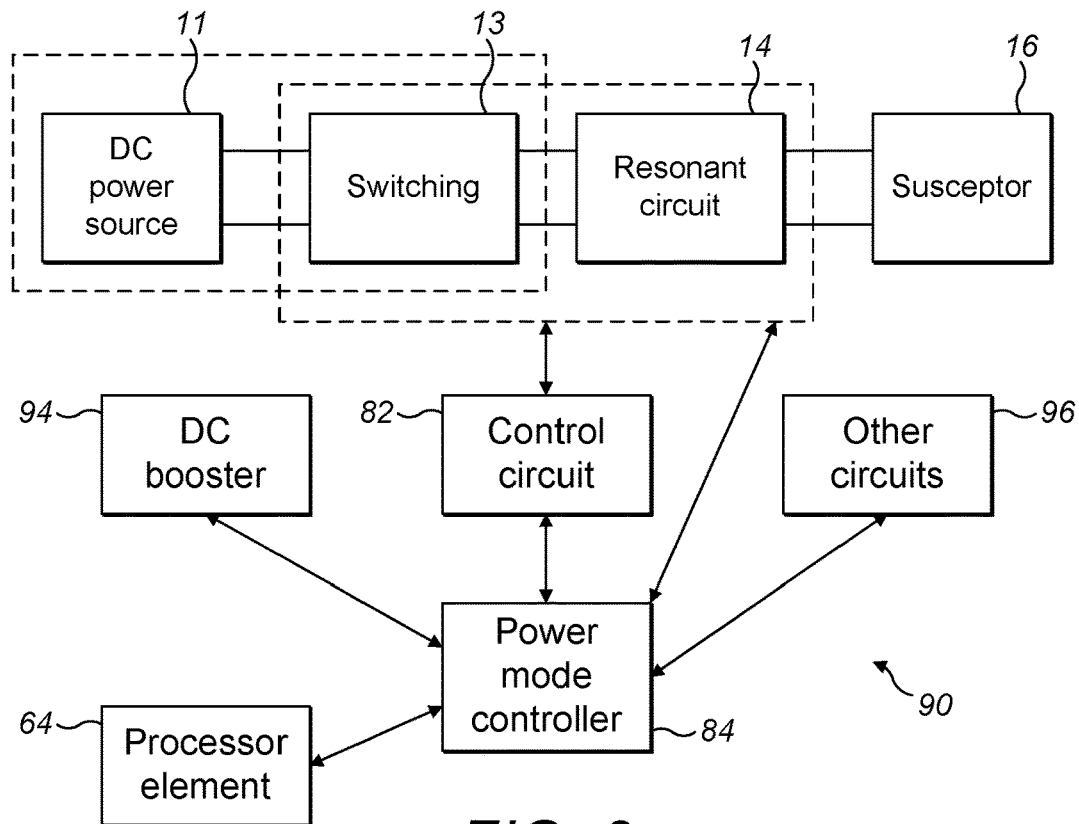
FIG. 9 is a block diagram of a system in accordance with an example embodiment.

FIG. 9 is a block diagram of a system, indicated generally by the reference numeral 90, in accordance with an example embodiment. The system comprises the DC power source 11, the switching arrangement 13, the resonant circuit 14 and the susceptor arrangement 16 of the system 10 described above with reference to FIG. 1. The system 90 also comprises the driver circuit 82 and the power mode controller 84 of the system 80 described above with reference to FIG. 8.

The system 90 further comprises a DC booster 94 (such as a boost converter) for boosting a DC level of the power supply to an operational DC level. The system further comprises one or more other circuits 96 in communication with the power mode controller 84 and the processor element 64 described above for controlling the mode of operation of the power mode controller 84.

As described above, the power mode controller 84 enables control signals to be provided to the switching arrangement 13 by the driver circuit 82 in a heating mode of operation and disconnects at least part of the driver circuit 82 from the power supply in a power saving mode of operation (thereby preventing control signals from being provided by the driver circuit 82 to the switching arrangement 13).

In the system 90, the power mode controller 84 provides similar control signals to one or more further modules (in addition to, or instead of, the driver circuit 82). Thus, the power mode controller 84 may be configured to disconnect the DC booster 94 and/or one or more other circuits 96 from the power supply in the power saving mode of operation.

Figure 10:
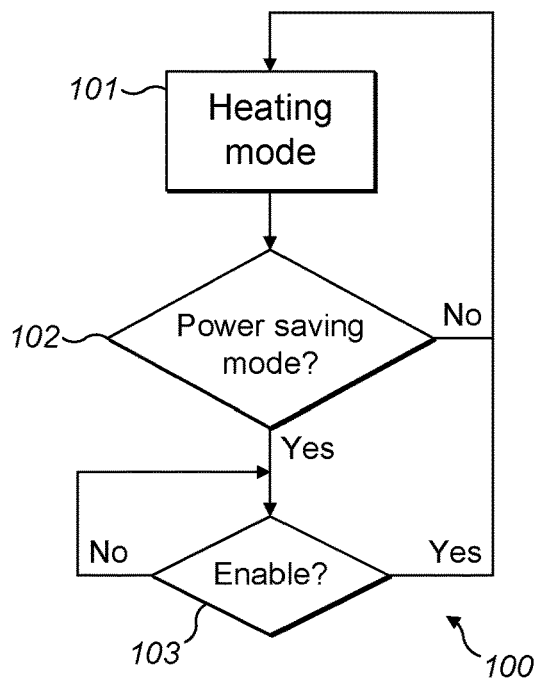
FIGS. 10 to 12 are flow charts showing algorithms in accordance with example embodiments.

FIG. 10 is a flow chart showing an algorithm, indicated generally by the reference numeral 100, in accordance with an example embodiment.

At operation 101, the algorithm 100 is in a heating mode of operation. As discussed above, in reference to FIG. 9, in the heating mode of operation, the driver circuit 82 is enabled to provide control signals to the switching arrangement 13 to thereby provide signals to the resonant circuit 14, for example for inductively heating the susceptor arrangement 16. At operation 102, it is determined whether to enter the power saving mode. If so, the power saving mode is entered (as discussed further below) in which the driver circuit 82 is disabled, and the algorithm moves to operation 103. If not, the algorithm returns to operation 101.

At operation 103, it is determined whether to enable the heating mode. If so, the algorithm moves to operation 101. If not, the algorithm returns to operation 103.

Figure 11:
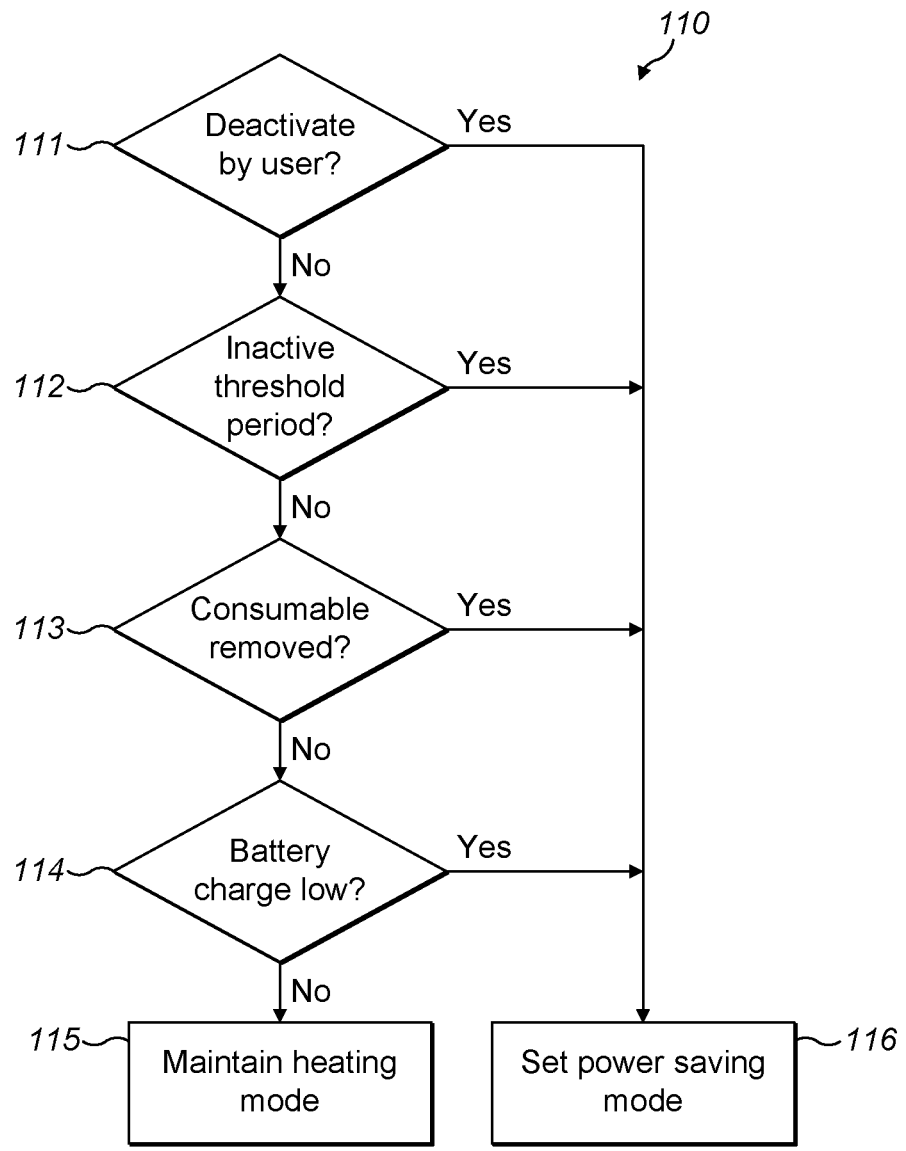

FIG. 11 is a flow chart showing an algorithm, indicated generally by the reference numeral 110, in accordance with an example embodiment. The algorithm 110 is an example implementation of the operation 102 of the algorithm 100 described above.

At operation 111, it is determined whether the system is deactivated by a user. If so, the algorithm moves to operation 116; if not, the algorithm moves to operation 112. For example, the system may be deactivated by the user supplying a signal via a user input mechanism, e.g., a button (such as the activation switch 22 of the device 20 described above with reference to FIG. 2), touchscreen, etc. to deactivate the device.

At operation 112, it is determined whether the system has been inactive in the heating mode of operation for a first threshold time period (such as 60 seconds, although different time periods could readily be used). If so, the algorithm moves to operation 116; if not, the algorithm moves to operation 113. For example, the system may monitor for a user interaction, such as a user inhalation using an airflow sensor or the like, and in the absence of a user inhalation within the time limit, the system enters the power saving mode.

At operation 113, it is determined whether an article that is to be heated by a susceptor arrangement has been removed. If so, the algorithm moves to operation 116; if not, the algorithm moves to operation 114.

At operation 114, it is determined whether if a battery of the apparatus has a charge level below a battery threshold. If so, the algorithm moves to operation 116; if not, the algorithm moves to operation 115.

At operation 115, the heating mode is maintained and the algorithm 110 ends (for example, the operation 102 of the algorithm 100, of FIG. 10, may be answered in the negative). The operation 101 of the algorithm 100 may then be repeated.

At operation 116, the power saving mode is set and the algorithm 110 ends (for example, the operation 102 of the algorithm 100 may be answered in the positive). The algorithm 100 may then proceed to operation 103.

Other operations could be included instead of, or in addition to, the operations of the algorithm 110; moreover, the operations could be provided in a different order. Moreover, it should be appreciated that other algorithms may be implemented in which one or more of the operations of algorithm 110 are implemented.

Figure 12:
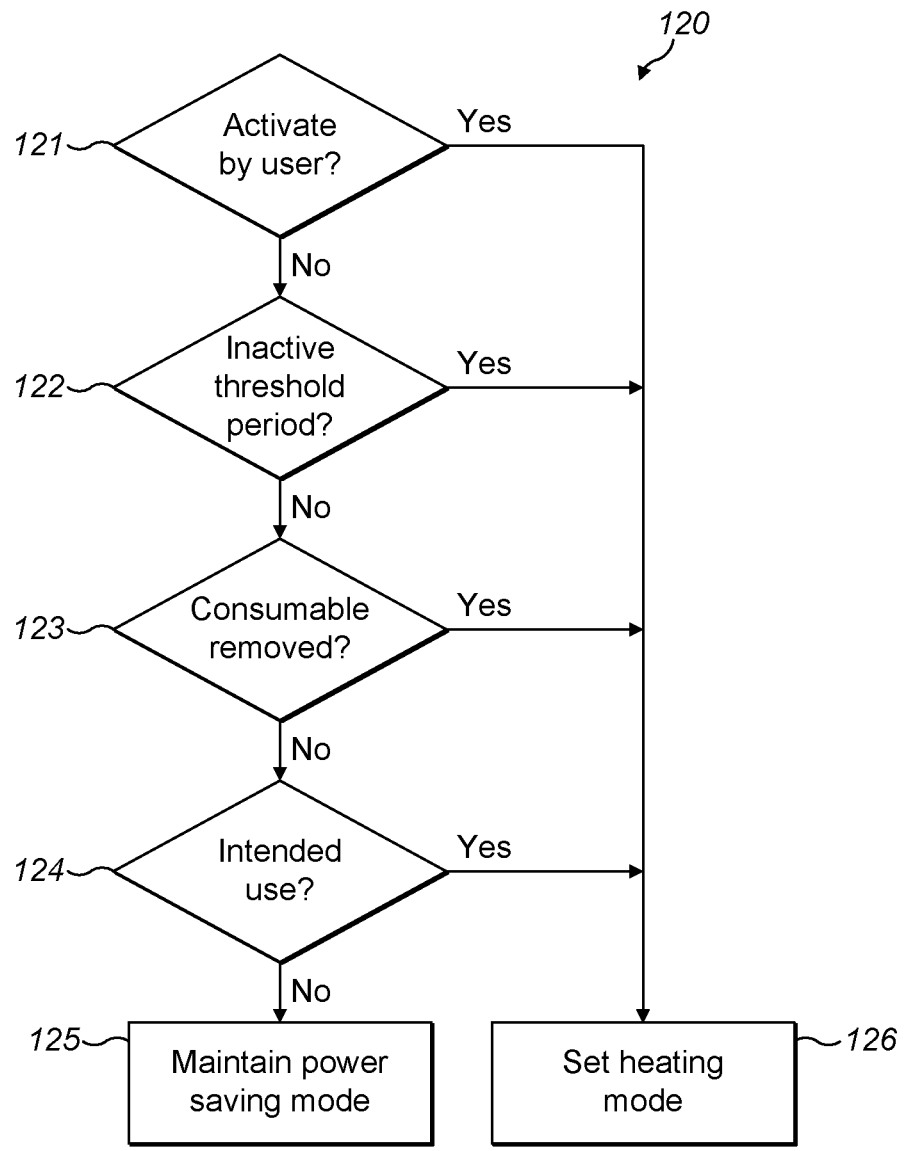

FIG. 12 is a flow chart showing an algorithm in accordance with an example embodiment. The algorithm 120 is an example implementation of the operation 103 of the algorithm 100 described above with reference to FIG. 10.

At operation 121, it is determined whether the system activated by a user. If so, the algorithm moves to operation 126; if not, the algorithm moves to operation 122.

At operation 122, it is determined whether the system has been inactive in the power saving mode of operation for a second threshold time period (such as 60 seconds, although different time periods could readily be used). If so, the algorithm moves to operation 126; if not, the algorithm moves to operation 123.

At operation 123, it is determined whether an article that is to be heated by a susceptor arrangement has been inserted. If so, the algorithm moves to operation 126; if not, the algorithm moves to operation 124.

At operation 124, it is determined whether a movement sensor output is indicative of an intended use of the aerosol generating device (i.e. whether a user intends to use the aerosol generating device). If so, the algorithm moves to operation 126; if not, the algorithm moves to operation 125.

At operation 125, the power saving mode is maintained and the algorithm 120 ends (for example, the operation 103 of the algorithm 100 may be answered in the negative). The operation 103 of the algorithm 100 may then be repeated.

At operation 126, the heating mode is set and the algorithm 120 ends (for example, the operation 103 of the algorithm 100 may be answered in the positive). The algorithm 100 may then return to operation 101.

Other operations could be included instead of, or in addition to, the operations of the algorithm 120; moreover, the operations could be provided in a different order. Moreover, it should be appreciated that other algorithms may be implemented in which one or more of the operations of algorithm 120 are implemented.

It should be appreciated that, in some implementations, additional modes of operation may be provided other than the power saving mode and the heating mode. For example, a stand-by mode may be implemented. The stand-by mode may enable power to be supplied to the various circuitry components (such as the drive circuitry 82 and/or the DC booster 94 depicted in FIG. 9) but no heating may occur during this time. In other words, the stand-by mode may enable connection of the various circuitry components to the power supply, but the various circuitry components may not be controlled to perform heating. In this regard, when in the stand-by mode of operation, the system may monitor for a user input (such as a button press) to signify that the user wishes to begin heating, and in response, the system may then perform heating of the susceptor element accordingly. Like in operations 112, shown in FIGS. 11, and 122, shown in FIG. 12, an inactive threshold may be implemented which transitions the stand-by mode to the power saving mode if no activity is detected in the stand-by mode. Additionally, like operations 112 and 122, an inactive threshold may be implemented which transitions the heating mode to the stand-by mode or power saving mode if no activity is detected in the heating mode. In some implementations, however, the heating mode may be implemented for a pre-set time, e.g., 4-5 minutes. After this time, the mode of operation may transition to the stand-by or power saving mode.

Figure 13:
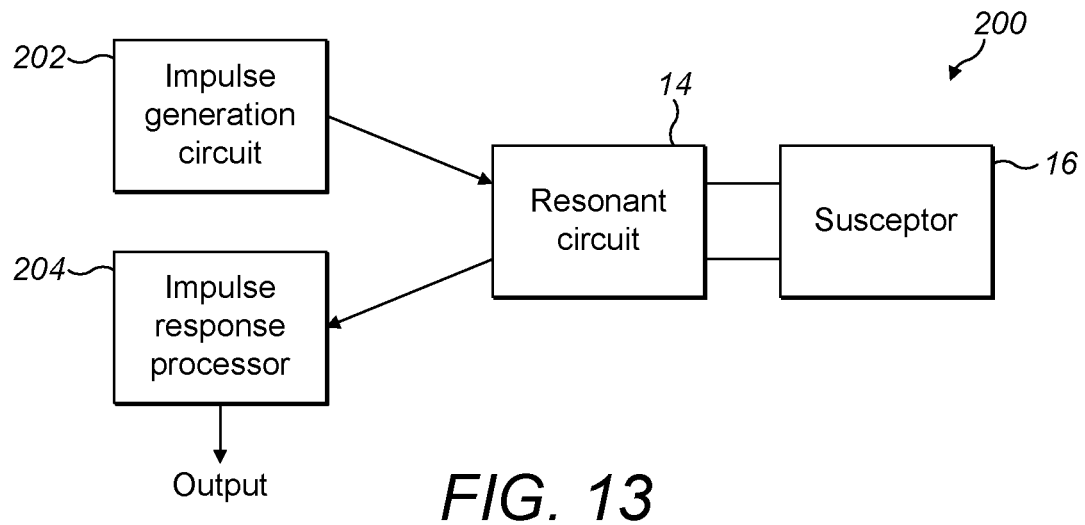
FIG. 13 is a block diagram of a system in accordance with an example embodiment.

FIG. 13 is a block diagram of a system, indicated generally by the reference numeral 200, in accordance with an example embodiment. The system 200 comprises the resonant circuit 14 and the susceptor 16 of the system 10 described above with reference to FIG. 1. The system 200 further comprises an impulse generation circuit 202 and an impulse response processor 204. The impulse generation circuit 202 and the impulse response processor 204 may be implemented as part of the control circuit 18 of the system 10.

The impulse generation circuit 202 may be implemented using a first switching arrangement (such as an H-bridge circuit) to generate the impulse by switching between positive and negative voltage sources. For example, the switching arrangement 44 described above with reference to FIG. 5 may be used. As described further below, the impulse generation circuit 202 may generate an impulse by changing the switching states of the FETs of the switching arrangement 44 from a condition where the switches 45b and 45d are both on (such that the switching arrangement is grounded) and the switches 45a and 45b are off, to a state where the switch states of one of the first and second circuit branches 44a and 44b are reversed. The impulse generation circuit 202 may alternatively be provided using a pulse width modulation (PWM) circuit. Other impulse generation arrangements are also possible.

Figure 14:
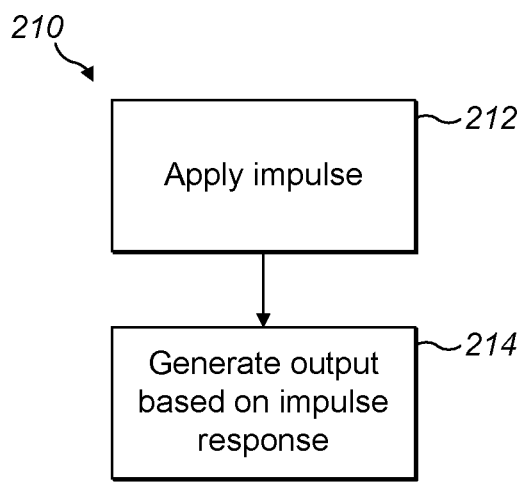
FIG. 14 is a flow chart showing an algorithm in accordance with an example embodiment.

FIG. 14 is a flow chart showing an algorithm, indicated generally by the reference numeral 210, in accordance with an example embodiment. The algorithm 210 shows an example use of the system 200 shown in FIG. 13.

Figure 15:
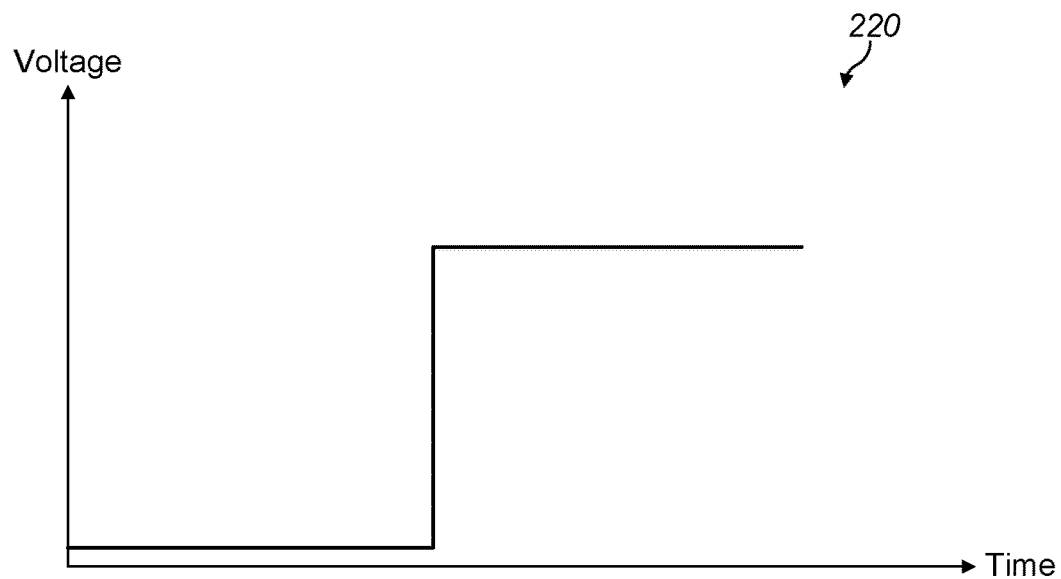
FIGS. 15 and 16 are plots demonstrating example uses of example embodiments.
Figure 16:
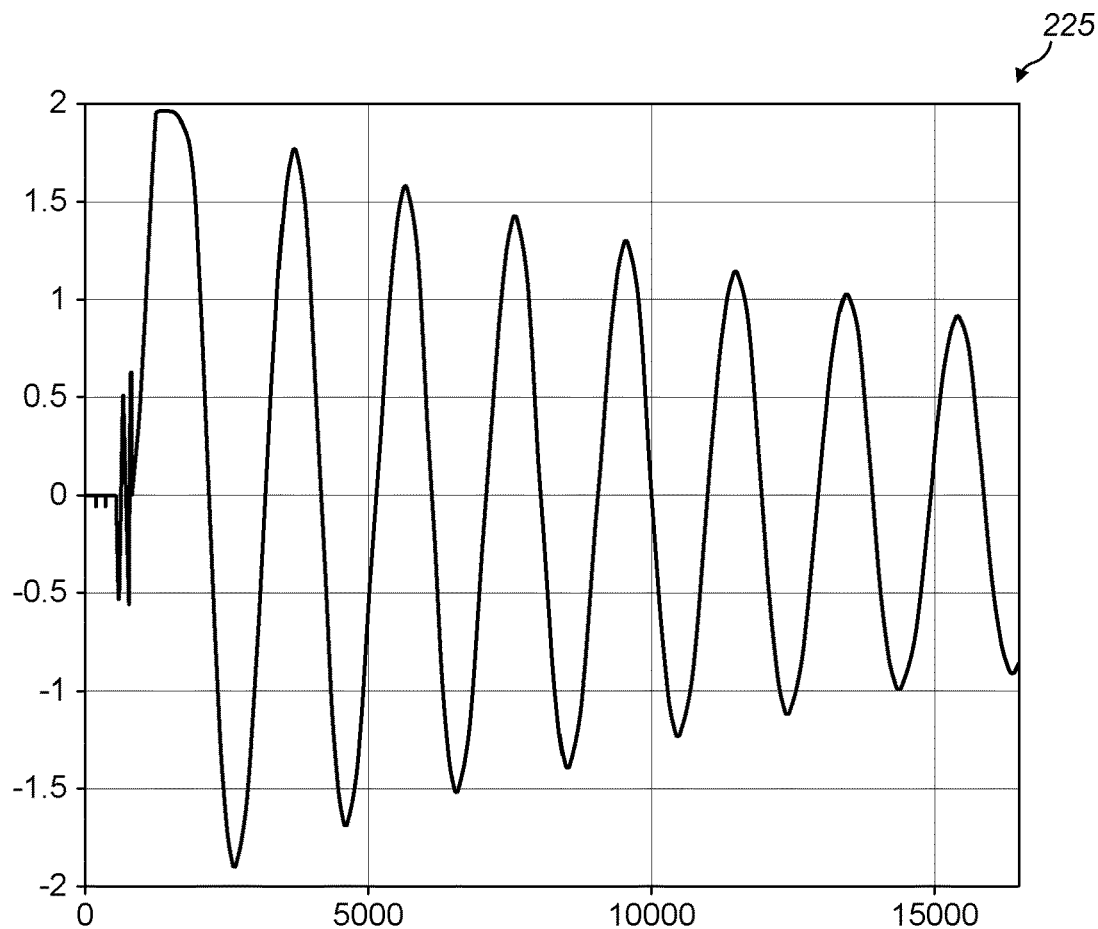
Figure 17:
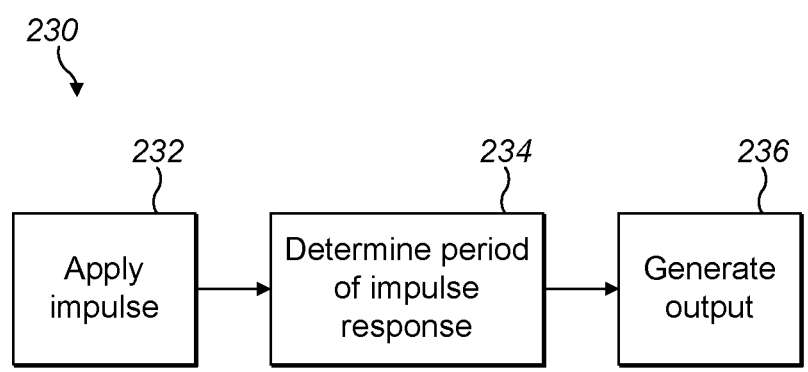
FIG. 17 is a flow chart showing an algorithm in accordance with an example embodiment.
Figure 18:
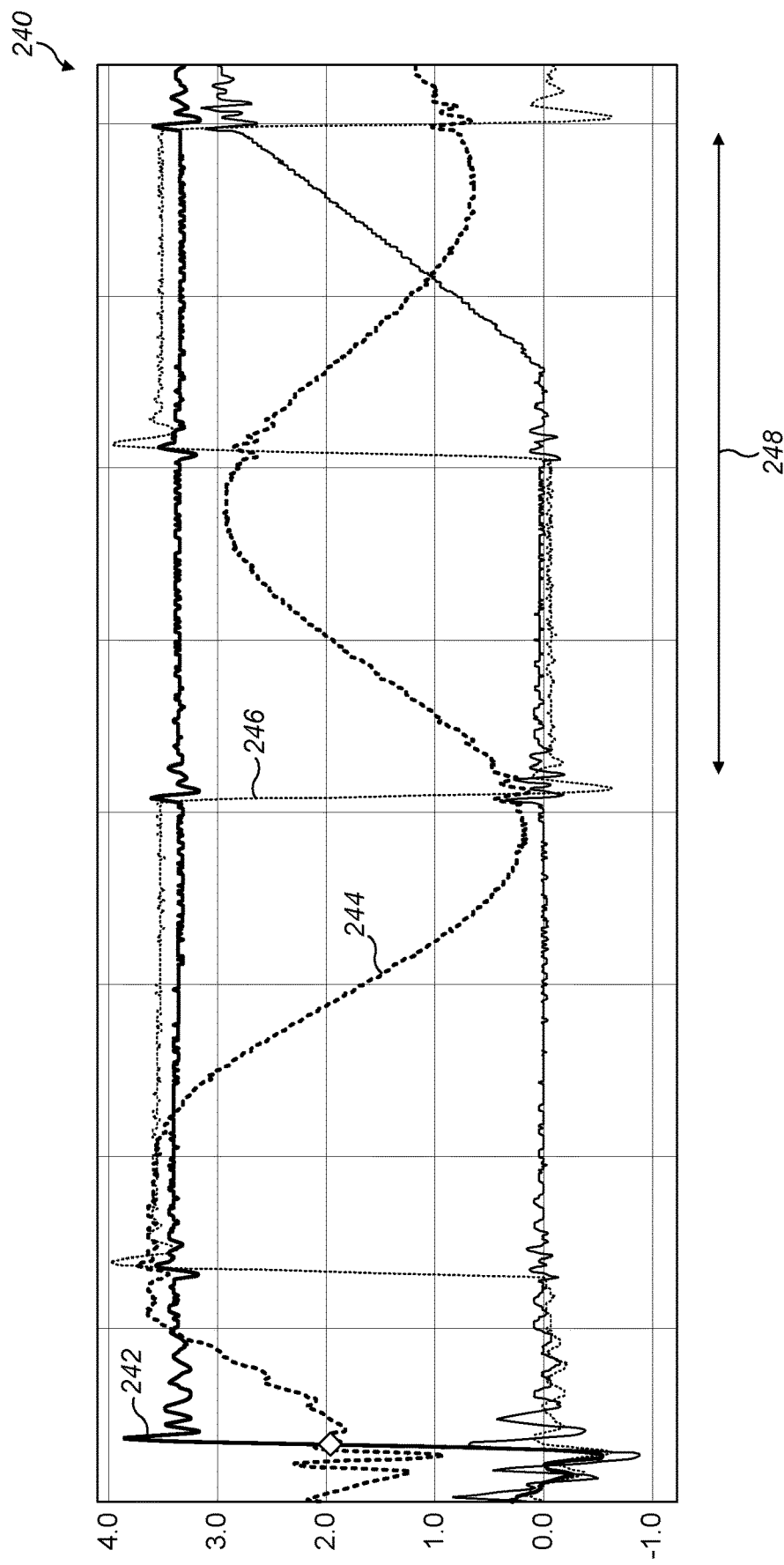
FIG. 18 is a plot demonstrating an example use of the example embodiments.
Figure 19:
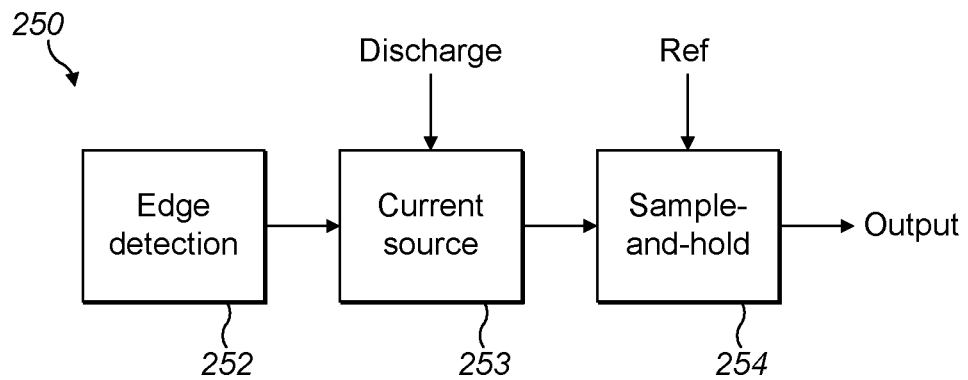
FIG. 19 is a block diagram of a system in accordance with an example embodiment.

The algorithm 210 starts at operation 212 where an impulse (generated by the impulse generation circuit 202) is applied to the resonant circuit 14. FIG. 15 is a plot, indicated generally by the reference numeral 220, showing an example impulse that might be applied in the operation 212.

Figure 20:
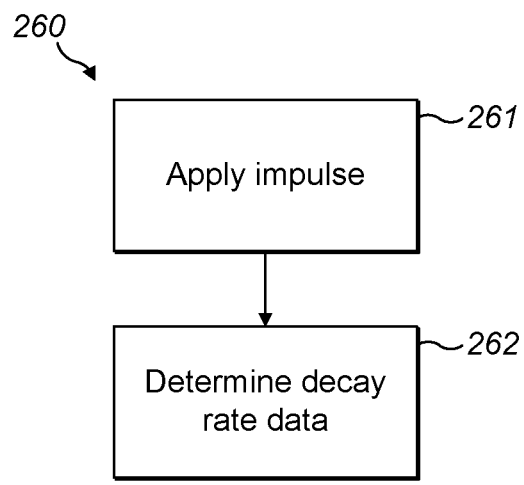
FIG. 20 is a flow chart showing an algorithm in accordance with an example embodiment.

The impulse may be applied to the resonant circuit 14. Alternatively, in systems having multiple inductive elements (such as non-combustible aerosol arrangement 20 described above with reference to FIGS. 2 and 3), the impulse generation circuit 202 may select one of a plurality of resonant circuits, each resonant circuit comprising an inductive element for inductively heating a susceptor and a capacitor, wherein the applied impulse induces an impulse response between the capacitor and the inductive element of the selected resonant circuit.

At operation 214, an output is generated (by the impulse response processor 204) based on an impulse response that is generated in response to the impulse applied in operation 212. FIG. 16 is a plot, indicated generally by the reference numeral 225, showing an example impulse response that might be received at the impulse response processor 204 is response to the impulse 220. As shown in FIG. 16, the impulse response may take the form of a ringing resonance. The impulse response is a result of charge bouncing between the inductor(s) and capacitor of the resonant circuit 14.

In one arrangement, no heating of the susceptor is caused as a result. That is, the temperature of the susceptor remains substantially constant (e.g., within ±1° C. or ±0.1° C. of the temperature prior to applying the impulse).

At least some of the properties of the impulse response (such as frequency and/or decay rate of the impulse response) provide information regarding the system to which the impulse is applied. Thus, as discussed further below, the system 200 can be used to determine one or more properties of the system to which the impulse is applied. For example one or more performance properties, such as fault conditions, properties of an inserted article 21, whether the article 21 is genuine, presence or absence of such an article, temperature of operation etc., can be determined based on output signal derived from an impulse response. The system 200 may use the determined one or more properties of the system to perform further actions (or prevent further actions if so desired) using the system 10 of FIG. 1, for example, to perform heating of the susceptor arrangement 16. For instance, based on the determined temperature of operation, the system 200 can choose what level of power is to be supplied to the induction arrangement to cause further heating of the susceptor arrangement, or whether power should be supplied at all. For some performance properties, such as fault conditions or determining whether the article 21 is genuine, a measured property of the system (as measured using the impulse response) can be compared to an expected value or range of values for the property, and actions taken by the system 200 are performed on the basis of the comparison.

FIG. 17 is a flow chart showing an algorithm, indicated generally by the reference numeral 230, in accordance with an example embodiment. At operation 232 of the algorithm 230, an impulse is applied to the resonant circuit 14 by the impulse generation circuit 202 discussed in reference to FIG. 13 above. Thus, the operation 232 is the same as the operation 212 described above in reference to FIG. 14.

At operation 234 of the algorithm 230, a period of an impulse response induced in response to the applied impulse is determined by the impulse response processor 204 of FIG. 13. Finally, at operation 236, an output is generated (based on the determined period of the impulse response).

FIG. 18 is a plot, indicated generally by the reference numeral 240, showing an example use of the algorithm 230. The plot 240 shows an impulse 242 applied to the resonant circuit 14 by the impulse generation circuit 202 of FIG. 13. The application of the impulse 242 implements the operation 232 of the algorithm 230 of FIG. 17. An impulse response 244 is induced in response to the applied impulse. The impulse 242 may be held in its final state (high in the plot 240) for the duration of the measurement, but this is not essential. For example, a high-low impulse could be applied (and then held low).

The impulse response processor 204, shown in FIG. 13, generates a signal 246 indicating edges of the impulse response 234. As discussed further below, the signal 246 may be generated by a comparator and there may be a delay between the occurrence of the edge and the generation of the signal. If consistent, that delay may not be significant to the processing.

At operation 234 of the algorithm 230, a period of the impulse response is determined. An example period is indicated by the arrow 248 in FIG. 18.

At operation 236 of the algorithm 230, an output is generated based on the determined period 248. Thus, the output signal is based on a time period from a first edge of the impulse and a second edge that is one complete cycle of said impulse response later. The output signal is therefore dependent on a time period of voltage oscillations of the impulse response, such that the output signal is indicative of the resonant frequency of the impulse response.

In some embodiments, the period 248 is temperature dependent. Accordingly, the output generated in operation 236 may be a temperature estimate of the susceptor 16 based on the measured period. That is, the period 248 of the impulse response 244 (as determined from signal 246 in the present example) may be used to determine the temperature of the susceptor 16, e.g. by use of a look-up table determined in advance.

FIG. 19 is a block diagram of a system, indicated generally by the reference numeral 250, in accordance with example embodiments. The system 250 may be used to implement the operations 236 of the algorithm 230 described above with reference to FIG. 17.

The system 250 comprises an edge detection circuit 252, a current source 253 and a sample-and-hold circuit 254.

The edge detection circuit 252 can be used to determine edges of signals, such as the impulse response signals 244 described above with reference to FIG. 18. Accordingly, the edge detection circuit 252 may generate the signals 246 described above with reference to FIG. 18. The edge detection circuit 252 may, for example, be implemented using a comparator or some similar circuit.

The edge detection circuit 252 provides an enable signal to the current source 253. Once enabled, the current source 253 can be used to generate an output (such as a voltage output across a capacitor). The current source 253 has a discharge input that acts as a reset input. The current source output can be used to indicate a time duration since an output of edge detection circuit 252 enabled the current source 253. Thus, the current source output can be used as an indication of time duration (e.g. pulse duration).

The sample-and-hold circuit 254 can be used to generate an output signal based on the output of the current source 253 at a particular time. The sample-and-hold circuit 254 may have a reference input. The sample-and-hold circuit 254 can be used as an analog-to-digital converter (ADC) that converts a capacitor voltage into a digital output. In other systems, any other suitable electronic components, such as a voltmeter, may be used to measure the voltage.

The system 250 may be implemented using a charge time measurement unit (CTMU), such as an integrated CTMU.

There are many other example uses of the systems described herein. By way of example, FIG. 20 is a flow chart showing an algorithm, indicated generally by the reference numeral 260, in accordance with an example embodiment. The algorithm 260 starts at operation 261 where an impulse is generated and applied to the resonant circuit 14 discussed above in reference to FIGS. 1 and 13. At operation 262, a decay rate of the impulse response induced in response to the applied impulse is determined. The decay rate may, for example, be used to determine information regarding the circuit to which the impulse is applied. By way of example, a decay rate in the form of a Q-factor measurement may be used to estimate a temperature of operation. The operation 262 is an example of the operation 214 of FIG. 14. That is, the decay rate is an example of an output based on the impulse response.

Figure 21:
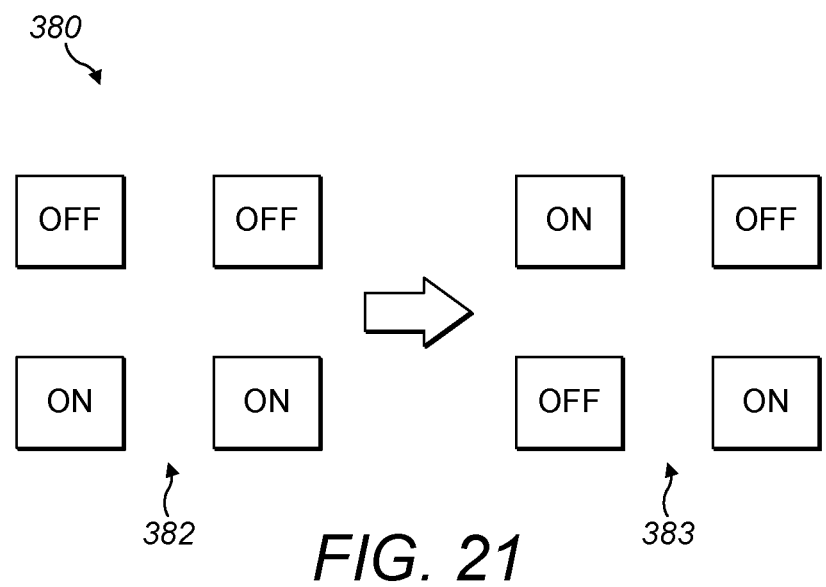
FIG. 21 is a block diagram of a circuit switching arrangement in accordance with an example embodiment.

FIG. 21 is a block diagram of a circuit switching arrangement, indicated generally by the reference numeral 380, in accordance with an example embodiment. The switching arrangement 380 shows switch positions of the circuit 40, discussed above in reference to FIG. 5, in a first state, indicated generally by the reference numeral 382, and a second state, indicated generally by the reference numeral 383.

In the first state 382, the switches 45a and 45c of the circuit 40 are off (i.e. open) and the switches 45b and 45d are on (i.e. closed). In the second state 383, the switches 45a and 45d are on (i.e. closed) and the switches 45b and 45c are off. Thus, in the first state 382, both sides of the resonant circuit 49 are connected to ground. In the second state 383, a voltage pulse (i.e. an impulse) is applied to the resonant circuit.

Figure 22:
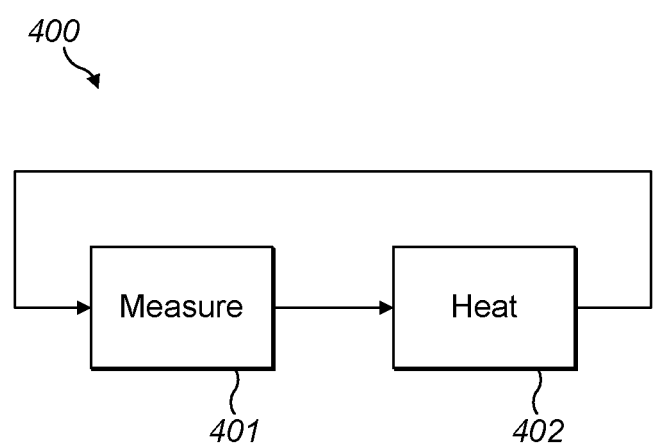
FIGS. 22 and 23 are flow charts showing algorithms in accordance with example embodiments.

FIG. 22 is a flow chart, indicated generally by the reference numeral 400, showing an algorithm in accordance with an example embodiment. The algorithm 400 shows an example use of the systems described herein.

The algorithm 400 starts with a measurement operation 401. The measurement operation 401 may, for example, include a temperature measurement. Next, at operation 402, a heating operation is carried out. The implementation of the heating operation 402 may be dependent on the output of the measurement operation 401. Once the heating operation 402 is complete, the algorithm 400 returns to operation 401, where the measurement operation is repeated.

The operation 401 may be implemented by the system 200, discussed above in reference to FIG. 13, in which an impulse is applied by the impulse generation circuit 202 and a measurement (e.g. a temperature measurement) determined based on the output of the impulse response processor 204. As discussed above, a temperature measurement may be based, for example, on a decay rate, an impulse response time, an impulse response period etc.

The operation 402 may be implemented by controlling the circuit 40, discussed above in reference to FIG. 5, in order to heat the susceptor 16 of the system 10 shown in FIG. 1. The inductive heating arrangement 12 may be driven at or close to the resonant frequency of the resonant circuit, in order to cause an efficient heating process. The resonant frequency may be determined based on the output of the operation 401.

In one implementation of the algorithm 400, the measurement operation is conducted for a first period of time, the heating operation 402 is conducted for a second period of time and the process is then repeated. For example, the first period of time may be 10 ms and the second period of time may be 250 ms, although other time periods are possible. In other words, the measurement operation may be performed between successive heating operations. It should also be noted that the heating operation 402 being conducted for the second period of time does not necessarily imply that power is supplied to the induction coil for the whole duration of the second period of time. For example, power may only be supplied for a fraction of the second period of time.

In an alternative embodiment, the algorithm 400 may be implemented with the heating operation 402 having a duration dependent on a required level of heating (with the heating duration being increased if more heating is required and reduced if less heating is required). In such an algorithm, the measurement operation 401 may simply be carried out when heating is not being conducted, such that the heating operation 402 need not be interrupted in order to conduct the measurement operation 401. This interleaved heating arrangement may be referred to as a pulse-width-modulation approach to heating control. By way of example, a pulse-width modulation scheme may be provided at a frequency of the order of 100 Hz, where each period is divided into a heating portion (of variable length) and a measurement portion.

Figure 23:
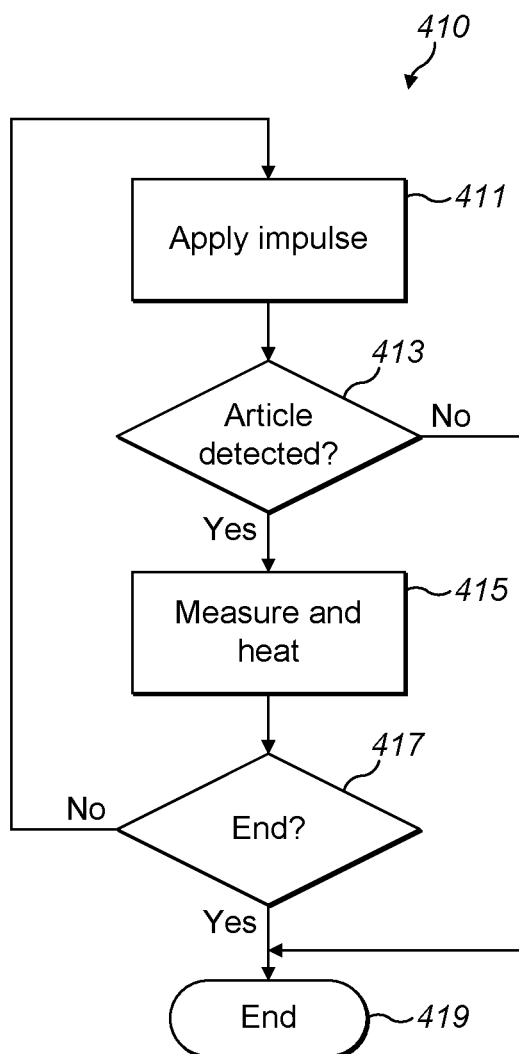

FIG. 23 is a flow chart, indicated generally by the reference numeral 410, showing an algorithm in accordance with an example embodiment. The algorithm 410 may be implemented using the system 10 described above with reference to FIG. 1.

The algorithm 410 starts at operation 411, where an impulse is applied to the resonant circuit 14 by the switching circuit 13 (e.g. the circuit 40 of FIG. 5). At operation 413, an impulse response (e.g. detected using the impulse response processor 64 of FIG. 6) is used to determine whether an article (such as the article 21 of FIGS. 2-3) is present in the system to be heated. As discussed above, the presence of the article 21 affects the impulse response in a manner that can be detected.

If an article is detected at operation 413, the algorithm 410 moves to operation 415; otherwise, the algorithm terminates at operation 419.

At operation 415, measurement and heating operations are implemented. By way of example, the operation 415 may be implemented using the algorithm 400 described above in reference to FIG. 22. Of course, alternative measurement and heating arrangements could be provided.

Once a number of heating measurement and heating cycles have been conducted, the algorithm 400 moves to operation 417, where it is determined whether heating should be stopped (e.g. if a heating period has expired, or in response to a user input). If so, the algorithm terminates at operation 419; otherwise the algorithm 400 returns to operation 411.

It should be appreciated that the above techniques for determining one or more properties of the inductive arrangement or susceptor arrangement can be applied to individual inductive elements. For systems that comprise multiple inductive elements, such as the system 20 of FIGS. 2-3, which comprises three inductive elements 23a, 23b, and 23c, the system may be configured such that the one or more parameters, such as the temperature, can be determined for each of the inductive elements using the above described techniques. In some implementations, it may be beneficial for the system to operate using separate measurements for each of the inductive elements. In other implementations, it may be beneficial for the system to operate using only a single measurement for the plurality of inductive elements (e.g., in the case of determining whether the article 21 is present or not). In such situations, the system may be configured to determine an average measurement corresponding to the measurements obtained from each inductive element. In other instances, only one of the plurality of inductive elements may be used to determine the one or more properties.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. An apparatus comprising:
a first switching arrangement configured to generate an alternating current from a power source, the alternating current flowing through an inductive element of a resonant circuit for inductively heating a susceptor arrangement to heat an aerosol generating material of an aerosol generating device to thereby generate an aerosol in a heating mode of operation;
a driver circuit comprising a control signal generator for generating a control signal for controlling the first switching arrangement;
a power mode switching arrangement configured to electrically disconnect the control signal generator from the power source in a power saving mode of operation to prevent the control signal generator from drawing power from the power source, thereby preventing control signals from being provided by the driver circuit to the switching arrangement in the power saving mode of operation; and
a control module for controlling the power mode switching arrangement, wherein the control module sets the apparatus in the heating mode of operation or the power saving mode of operation and controls the power mode switching arrangement accordingly.

2. The apparatus of claim 1, further comprising a boost converter for boosting a DC level of the power source to an operational DC level, wherein the power mode switching arrangement is configured to disconnect the boost converter from the power source in the power saving mode of operation.

3. The apparatus of claim 1, wherein the first switching arrangement comprises an H-bridge circuit used to generate the alternating current by switching between a positive voltage source and a negative voltage source.

4. The apparatus of claim 1, wherein the control module is configured to set the apparatus in the power saving mode of operation in response to one or more of:
the aerosol generating device has been inactive in the heating mode of operation for a first threshold time period;
the aerosol generating device is deactivated by a user;
a device comprising the susceptor arrangement is removed from the aerosol generating device;
an article that is heated by the susceptor arrangement is removed from the aerosol generating device; or
a battery of the apparatus has a charge level below a battery threshold.

5. The apparatus of claim 1, wherein the control module is configured to set the apparatus to the heating mode of operation in response to one or more of:
the aerosol generating device has been in the power saving mode of operation for a second threshold time period;
the aerosol generating device is activated by a user;
a device comprising the susceptor arrangement is inserted into the aerosol generating device;
an article that is heated by said susceptor arrangement is inserted into the aerosol generating device; or
a movement sensor output is indicative of an intended use of the aerosol generating device.

6. The apparatus of claim 1, wherein the power mode switching arrangement is configured to disconnect one or more further modules from the power source in the power saving mode of operation.

7. A non-combustible aerosol generating device comprising the apparatus as claimed in claim 1.

8. The non-combustible aerosol generating device of claim 7, wherein the aerosol generating device is configured to receive a removable article comprising an aerosol generating material.

9. The non-combustible aerosol generating device of claim 8, wherein the aerosol generating material comprises an aerosol generating substrate and an aerosol forming material.

10. The non-combustible aerosol generating device of claim 8, wherein the removable article includes the susceptor arrangement.

11. The non-combustible aerosol generating device of claim 7, wherein the apparatus comprises a tobacco heating system.

12. A kit of parts comprising an article for use in a non-combustible aerosol generating system, wherein the non-combustible aerosol generating system comprises the apparatus as claimed in claim 1.

13. The kit of parts of claim 12, wherein the article is a removable article comprising an aerosol generating material.

14. A method comprising:
setting a mode of operation of an aerosol generating device to a heating mode of operation or a power saving mode of operation, wherein the aerosol generating device comprises a resonant circuit comprising an inductive element for inductively heating a susceptor arrangement to heat an aerosol generating material to thereby generate an aerosol in the heating mode of operation; and
controlling a power mode switching arrangement to enable a driver circuit of the aerosol generating device in the heating mode of operation and to disable the driver circuit in the power saving mode of operation, wherein the driver circuit comprises a control signal generator, and such that the control signal generator of the driver circuit is electrically disconnected from the power source in the power saving mode of operation to prevent the control signal generator from drawing power from the power source, thereby preventing control signals from being provided by the driver circuit to the switching arrangement in the power saving mode of operation.

15. The method of claim 14, further comprising setting the aerosol generating device to the power saving mode of operation in response to the aerosol generating device being inactive in the heating mode of operation for a first threshold time period.

16. The method of claim 14, further comprising setting the aerosol generating device to the power saving mode of operation in response to the aerosol generating device being deactivated by a user.

17. The method of claim 14, further comprising setting the aerosol generating device to the power saving mode of operation in response to an article comprising the susceptor arrangement being removed from the aerosol generating device.

18. The method of claim 14, further comprising setting the aerosol generating device to the power saving mode of operation in response to a replaceable article that is heated by the susceptor arrangement being removed from the aerosol generating device.

19. The method of claim 14, further comprising setting the aerosol generating device to the power saving mode of operation in response to a battery of the apparatus having a charge level below a battery threshold.

20. The method of claim 15, further comprising setting the aerosol generating device to the heating mode of operation in response to the aerosol generating device having been in the power saving mode of operation for a second threshold time period.

21. The method of claim 14, further comprising setting the aerosol generating device to the heating mode of operation in response to the aerosol generating device being activated by a user.

22. The method of claim 14, further comprising setting the aerosol generating device to the heating mode of operation in response to an article comprising the susceptor arrangement being inserted into the aerosol generating device.

23. The method of claim 14, further comprising setting the aerosol generating device to the heating mode of operation in response to a replaceable article heated by the susceptor arrangement being inserted into the aerosol generating device.

24. The method of claim 14, further comprising setting the aerosol generating device to the heating mode of operation in response to a movement sensor output indicative of an intended use of the aerosol generating device.

25. A computer program comprising instructions for causing an apparatus to perform at least the following:
set a mode of operation of an aerosol generating device to a heating mode of operation or a power saving mode of operation, wherein the aerosol generating device comprises a resonant circuit comprising an inductive element for inductively heating a susceptor arrangement to heat an aerosol generating material to thereby generate an aerosol in the heating mode of operation; and control a power mode switching arrangement to enable a driver circuit of the aerosol generating device in the heating mode of operation and to disable the driver circuit in the power saving mode of operation, wherein the driver circuit comprises a control signal generator, and such that the control signal generator of the driver circuit is electrically disconnected from a power source in the power saving mode of operation to prevent the control signal generator from drawing power from the power source, thereby preventing control signals from being provided by the driver circuit to the switching arrangement in the power saving mode of operation.

* * * * *